Oct. 9, 1934.                B. E. ELDRED                1,975,929
           SOUND RECORD AND METHOD OF MAKING THE SAME
              Filed Sept. 28, 1929      3 Sheets-Sheet 1
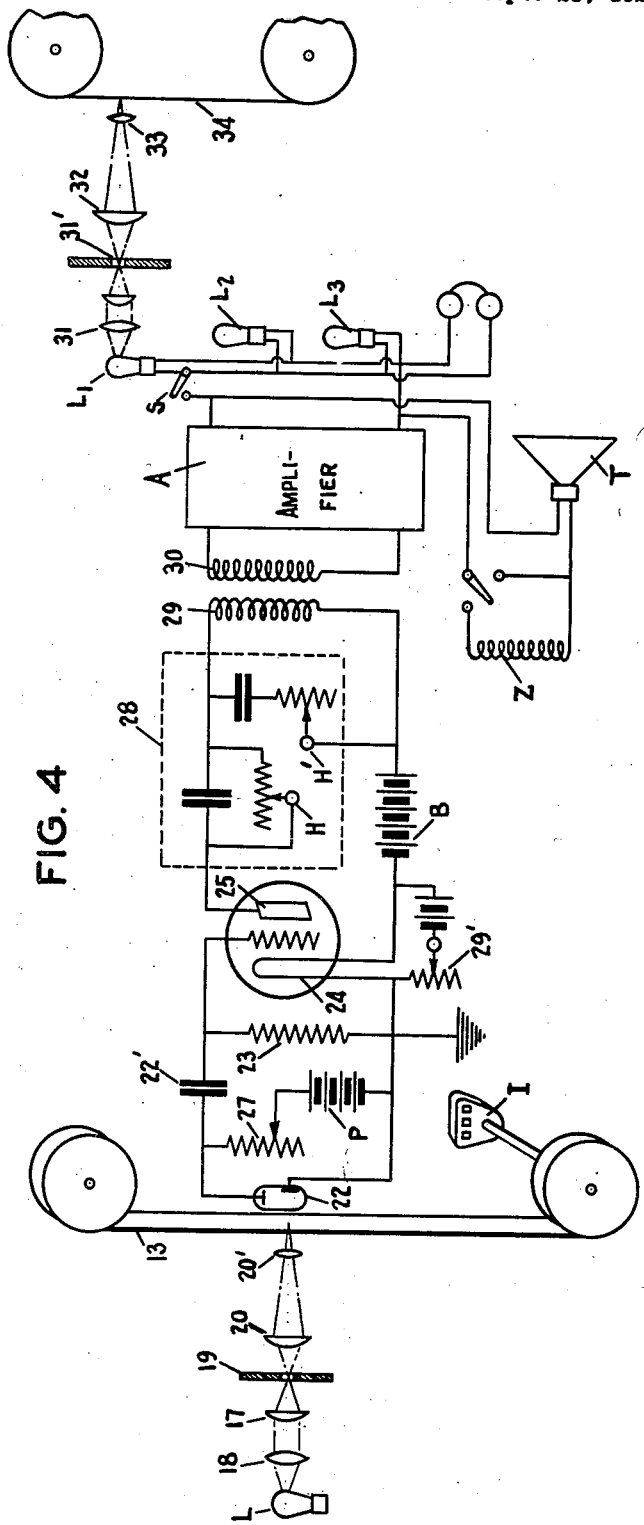
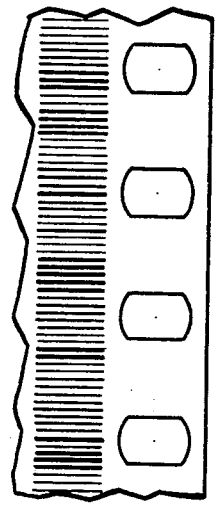
FIG. 2
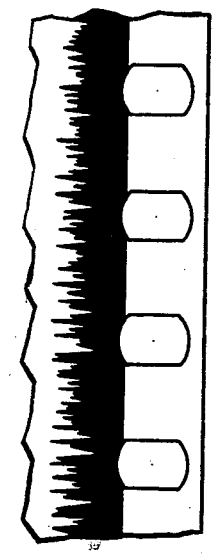
FIG. 1
INVENTOR
Byron E. Eldred
BY
ATTORNEY Oct. 9, 1934.   B. E. ELDRED   1,975,929
SOUND RECORD AND METHOD OF MAKING THE SAME
Filed Sept. 28, 1929   3 Sheets-Sheet 2
FIG. 3
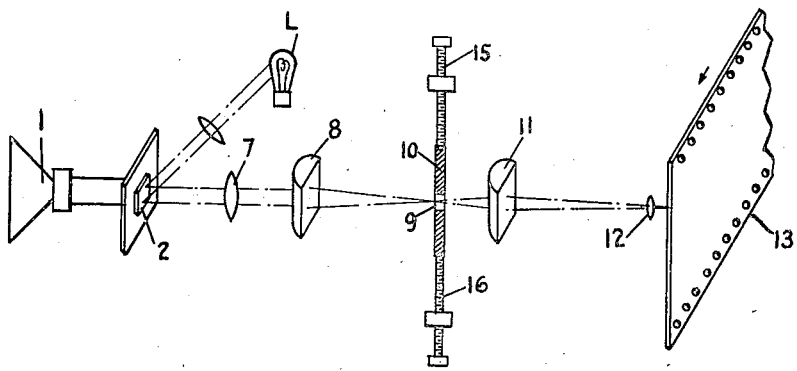
FIG. 5
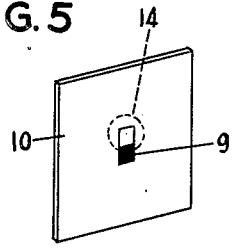
FIG. 7
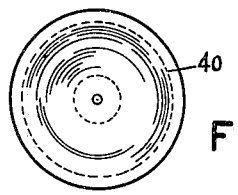
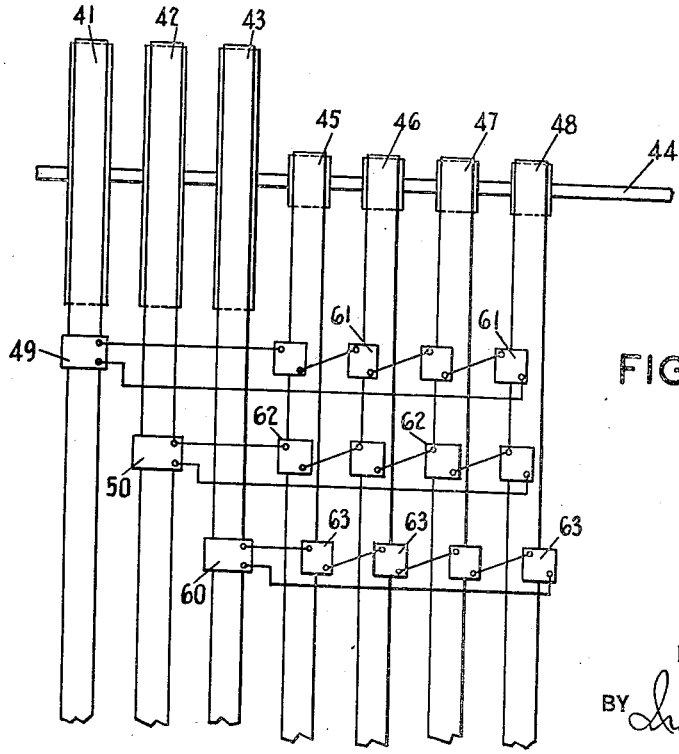
FIG. 6
INVENTOR
Byron E. Eldred
BY
ATTORNEY

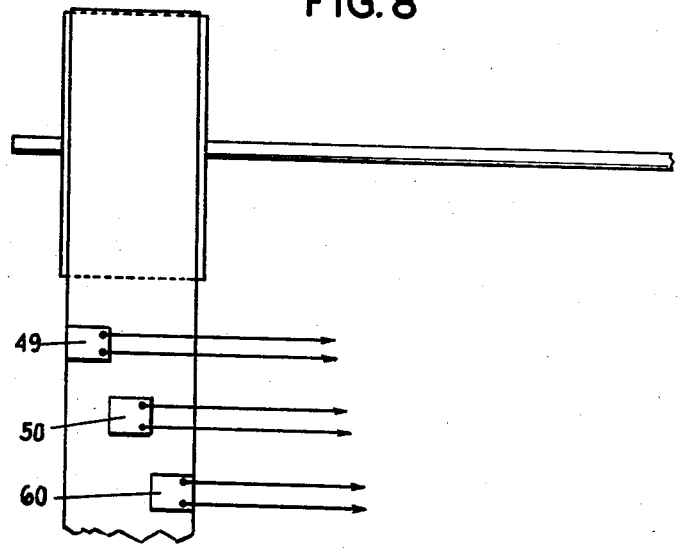
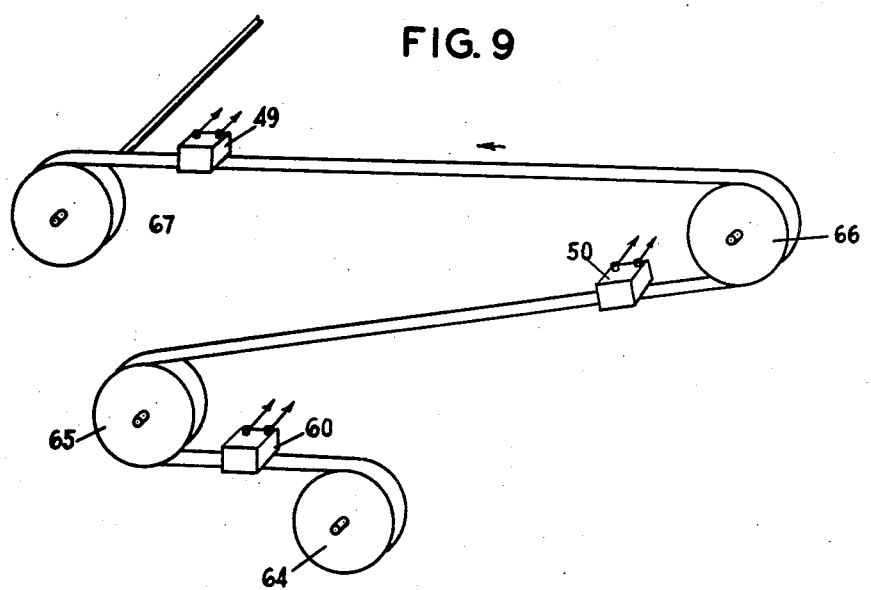

Patented Oct. 9, 1934

1,975,929

UNITED STATES PATENT OFFICE 1,975,929

SOUND RECORD AND METHOD OF MAKING THE SAME

Byron E. Eldred, New York, N. Y., assignor, by mesne assignments, to Radio Corporation of America, a corporation of Delaware Application September 28, 1929, Serial No. 395,820

5 Claims. (Cl. 179—100.3)

My invention relates to sound records and method of making the same, as well as to the reproduction of sound from such records, either with or without motion pictures. The invention is particularly applicable to the recording and reproducing of sound by photoelectric methods.

An object of the invention is to record sound serially throughout the length of the film and then to rerecord a plurality of sections of such record side by side or in parallel relation.

Another object of the invention is to rerecord as above but in much reduced scale as to enable one to obtain a very long record on a small amount of film.

Another objection is to produce a fine scale condensed record of microphotographic dimensions on non-grain film for long playing records such as would be needed to reproduce a book.

Other objects will appear in the following description:

The recent advent of radio broadcasting has popularized the reading and dramatization of books, plays and stories with the public playing merely the role of listener. Many people who will not listen to the reading of a book, for example, by a member of the household will listen with great interest to the exposition of the contents of a book by an expert reader as reproduced by a loud speaker. This may in part be due to the superior rendition of the subject matter by the skilled reader and in part to the control that the listener has in the rendition. If the rendition or subject matter is fascinating the listener may permit the loud speaker to continue the program. If unsatisfactory, a turn of the control knob will discontinue the reproduction. Whatever the reason is for this apparent change in attitude of the public, it is clear that as a general rule the general public is now eager to listen to the broadcasting of the subject matter of books and plays.

It is my idea that the public or a large part of it, would be still more interested in a phonograph that would speak the contents of a book, play or opera if satisfactory records of low cost, and reproducing apparatus therefor, are generally available. The best talent could be obtained for reading the books or presenting the plays and operas, and the selection of the records would in this case be absolutely under the control of the listener. The latter could not only discontinue the reproduction from the record if not satisfactory, but also could select any record at will which is something that cannot be done in radio broadcasting.

It is the purpose of my invention to make microscopic records of the contents of books, plays, operas, etc. so that an immense amount of matter may be put on one record. A book or play may then be placed on one record or at least on a small number of records. With such microscopic records the owner of a phonograph could listen for several hours to the latest reproduction or the readings of standard books.

The reproduction and use of these microscopic records and the apparatus necessary for reproduction therefrom, will vastly increase the knowledge of the general public in respect to literature of past and present authors. It would greatly increase the knowledge of the public in respect to the Bible and other religious literature. It would be of enormous benefit to the blind and a liberal education for the illiterate. In fact, it is impossible at present to visualize the benefits that would be received through the sale of the records and apparatus for reproduction.

By prior methods it would be difficult to make low priced satisfactory records of long discourses. The customary way of making records would necessitate the use of a large number of phonograph films or wax records. This not only would make the cost prohibitive but it also would entail too much work on the part of the listener in changing records.

Long records of plays, books and operas, etc. are generally referred to herein as "talking book" records. If the talking book records are to be made in microscopic form, as it is preferable to make them, light-sensitive films for receiving such records must be of high resolving power and great contrast. High resolving power and great contrast in photographic work requires a film emulsion which takes time to expose completely. Prior processes would not permit of the necessary time for making these records. In accordance with my invention I remove the time limiting factor by making a master record either by cutting grooves on the wax record or by photographing on a light sensitive film. I then use these records and the reproducing apparatus in the place of a microphone for making rerecordings on sub-master or commercial films.

In accordance with my method I convert the recordings of the master record into electrical impulses and rerecord another sub-master or a commercial record from these electrical impulses. The conversion of the original records into electrical impulses and a rerecording therefrom may be made as slow as desired; in fact, so slow that a loud speaker operated by electrical impulses would be wholly unsatisfactory.

By my method it will be seen that I remove the time limiting factor in photographic recording as a slow speed film of high resolving power and great contrast may be used and the rerecording speed may be slowed down to the point where one may take advantage of this type of slow film.

The original master record in my method of rerecording may be made in any desired way but I prefer to use the so-called variable area recording on suitable high speed film emulsion highly reactive to light.

Variable area recording is best suited for recording sound at these high speeds on so-called speed films. Film grains in this emulsion cause interfering sounds as they pass across the light beams. However, in the variable area type of sound record the sound track portion of the film is substantially entirely opaque or highly translucent. In the development of this type of record the coarse grains of the emulsion not exposed to light in the recording process are substantially entirely washed out in the developing process so that substantially the only portion of the sound track of the positive that contains these coarse grains is the opaque portion. The existence of these grains in that portion of the record produce little or no variation of sound, as relatively speaking, little light passes through such opaque portion. The variable area record made on high speed films therefore is much less subject to film grain noises.

It is true that the coarse grains of the emulsion lying on the edges and peaks of the opaque portion cause slightly defective positives by overlapping into the translucent portion where the demarcation should be perfectly sharp, but the defect in this respect is substantially completely eliminated by running the master film during recording at a higher speed as described. This widens out the base of the undulations so that the grains on the edge are a smaller proportion of the opaque part. It also brings out the higher frequencies that would otherwise be suppressed. This latter action is quite marked when the recording speed is increased from 90 to 135 feet per minute.

The sound tracks in a variable-density record have various gradations in shading and the lines are not entirely opaque or entirely clear as is substantially the case in the variable area record. The coarse grains of the silver are always present to a greater or less extent throughout these portions. A variable density record therefore made on a high speed film is not as suitable either for recording or reproduction because of the presence of the coarse grains in the emulsion which vary the light to a marked extent to produce undesired sounds. These grains in a master variable density negative are printed on the positive as variations in shading and produce the undesired sounds.

Variable-density records made on high speed films are not as suitable for the work for the additional reason that a speed film emulsion does not afford the contrast in light and shade necessary for translating a wide range of frequencies in variable density recording.

In the variable area record, opacity of the exposed portion is required and the unexposed portion after development, being substantially entirely clear, is employed to pass a varying quantity of light at constant quality. That is, one could fairly say that this type affords a quantitative analysis of light for reproducing sound. The variable density type of record, on the other hand, approximates a qualitative analysis of light.

A variable density record which provides substantially varying quality of light, has the advantage over the other type of record of requiring less space on the film; but to provide a fine scale of microscopic condensed record of sound of the variable density type a slow speed substantially non-grain emulsion film must be employed. Such a slow speed film cannot satisfactorily be used for making the original record, but I am able to make commercial records of the variable density type on slow speed films by my new method. These may be either normal recordings or microscopic recordings for the "talking book".

Records of sounds as heretofore made do not give a faithful reproduction of the sounds. High frequencies are depressed so that many of such frequencies are completely eliminated or overshadowed by the lower notes. In my application filed Sept. 28, 1929, Serial No. 395,819, on Methods of making sound records with correctly balanced frequencies, I disclose a method of balancing the frequencies. I prefer to use that invention in the system of the present application. In accordance with that invention I make a test reproduction of the sound from a record and by means of frequency controls I bring out the depressed frequencies and in some cases depress the lower notes so that a faithful reproduction of the original frequencies is secured. I also disclose a general volume control to amplify or intensify all frequencies at various portions, or at all portions of the record.

In re-recording sub-master or commercial records by optical means, as distinguished from contact or ordinary optical printing from negatives as now practiced, I vary the frequencies in accordance with the before-mentioned test by electrical means and am able to make sub-master records that have perfect balance of all frequencies and with desired general amplification. There are various ways of differentiation between the frequencies, but by way of example, I have shown the arrangement in the application of L. M. Cockaday, Serial No. 412,060, filed Dec. 26, 1929.

The manner in which the foregoing results are obtained is more particularly described in the following specification, reference being had to the drawings in which:

Fig. 1 illustrates the sound record of an optical phonograph or the sound track part of a sound-picture film in which the sound is recorded by the variable area method.

Fig. 2 illustrates a record containing sound records of the variable density type. In this figure one sound track is shown, but the entire record may be filled with sound tracks or a portion may be reserved for pictures, as desired.

Fig. 3 illustrates diagrammatically, with detailed apparatus removed for clearness of illustration, a system for recording sounds on a speed film to produce a record of variable area type either for an optical phonograph or a sound-picture record.

Fig. 4 illustrates diagrammatically a system for re-recording from the record made as in Fig. 3, for example, on a slow speed film to produce a record of variable density type.

Fig. 5 illustrates in conventional form a slot used in the system of Fig. 3. The slot for purposes of illustration is not drawn to correct dimensions as such slots are small.

Fig. 6 illustrates diagrammatically the way in which I produce a plurality of records of the variable density type from one record of the variable area type.

Fig. 7 is a modified form of sound record for circular rotatable records.

Fig. 8 is a modified form of the invention shown in Fig. 6.

Fig. 9 is still another modification of the invention of Fig. 6.

It will be understood that many mechanical parts have been omitted from the drawings. These are well known in the art and to show them in the figures would prevent ease of reading of the drawings. Such systems are shown in more complete detail in my Patent 1,655,811, January 10, 1928 and in the patent of C. A. Hoxie, 1,598,377, April 31, 1926.

Referring to Fig. 3, sounds to be recorded are received in microphone 1 of suitable type, such, for example, as that disclosed in the aforesaid Hoxie patent. Details of the microphone are not part of my invention and they are not shown. Light from source L is directed through appropriate means onto mirror 2 connected to vibrate in accordance with sounds entering the microphone, all as described in this Hoxie patent. The beams of light are reflected from the mirror through appropriate spherical lens 7 and cylindrical lens 8 on to the slot 9 of member 10. These beams pass through another cylindrical lens 11 that image this slot on a microscopic or reducing lens 12 which projects a real image in much reduced or microscopic scale on the high speed film 13. Lens 12 may either be a cylindrical or spherical lens or a combination of both. Each of the cylindrical lenses 8 and 11 as used in the system has the axis of the cylinder parallel with the length of the slot 9 which as shown is in the plane of the paper. The width of the slot may be taken as about two thousandths of an inch. The imaging of this slot one-half thousandth, for example, on the film is described in greater detail in my Patent 1,655,811, above referred to. It will be understood, of course, that only that portion of the slot is imaged on the film as is illuminated by the light beams.

The mirror and slot are relatively adjusted in respect to each other so that in normal position when no sounds are impinging on the microphone 1 the spot of light from the source L illuminates only a portion, preferably substantially half, of the slot 9. Fig. 5 illustrates this more in detail where the light is shown encompassed by the dotted line 14, the parts not being made to scale. That portion of the slot receiving the light is shown clear and the portion not receiving the light is shown dark in this figure. Thus it will be seen that in a transverse section of the sound track functioning with the slot at any instant part will, on development, be light, while the remaining portion of such section will be entirely dark. This is a characteristic feature of a variable area film.

In practice, it is the custom to adjust the mirror about its axis to focus the light in the right position on the slot in the normal or neutral position. However, for clearness of illustration I have shown adjusting screws 15 and 16 to adjust the slot member 10 which would produce the same relative adjustment between the mirror and the slot.

As the mirror 3 is made to oscillate in accordance with the sounds collected by the microphone 1, the spot or strip of light 14 travels up and down as shown in Fig. 5, to illuminate a greater or less portion of the section of the sound track functioning with the slot at that instant. The film 13 is traveling uniformly past the imaged slot to successively present new sections and the combined movement of the light on the film produces, after development, a variable area record such as shown in Fig. 1. This film travels at right angles to the length of the slot shown in Fig. 3.

In order to open out the base of the peaks of the sound record I continuously move during sound recording the high speed film 13 at a greater rate than is the custom in making a combined record of sound and picture. The normal recording speed for talking pictures or sound pictures, as well as the normal projecting speed, is about 90 feet per minute of film travel. The speeds I prefer are from 125 to 135 feet per minute though it will be understood that the increased speed would be such as is necessary to bring out the desired high frequencies, and to minimize film grain defects on the edge of the opaque portions as previously referred to.

After the sound is recorded at the increased speed the film is developed and fixed in the usual way. When the high speed film record, which we may call herein the prime master record, is finished the sub-master records, either of normal or reduced scale, are made in accordance with the system shown in Fig. 4. A light from source L passes through the usual system of lenses such as the cylindrical lens 17 and the spherical lenses 18, the slot member 19 and a second converging or spherical lens 20, which images the slot through microscopic lens 20' on to the continuously moving film 13 previously made by the variable area method already described in connection with Fig. 3. This film moves crosswise of the slot as before, but in this figure the width of the slot is in the plane of the paper. As the film moves it interrupts the light in such a way as to produce a varying quantity of illumination projected enlarged or condensed upon the photoelectrc cell 22 which may be of the usual type. This photoelectric cell is connected to the grid of an amplifier such as a three-electrode tube, in any of the well known circuit arrangements. By way of example, I have shown the anode connected to the grid circuit through coupling condenser 22' with grid leak resistance 23 connected between such grid and the grounded end of the filament 24, which point is also connected to the cathode of the photoelectric cell. The polarizing battery P, which may, for example, have a voltage of about 200 volts, is connected in series with appropriate resistance 27 across the terminals of the photoelectric cell.

The varying light thrown on to the active surface in photoelectric cell 22 will cause electrons to flow in accordance with the amount of light. This produces a potential on the grid which controls the electron flow from the filament 24 to the plate 25 and thence through the transformer primary 29 back to filament 24. This induces current in secondary 30 and the variations are amplified the desired extent by a sufficient number of vacuum tubes. These amplifiers are generally indicated by reference character A.

To make a test of the sound record, switch S is opened so that the re-recording apparatus will be idle and a person skilled in sound reproduction listens through a loud speaker T, and as the sound reel is run off such operator will manipulate the controls H and H' to bring out certain frequencies and depress others so that a correct balance of frequencies is heard in the device T. As these controls are set the scale reading of each is noted as is also the feet of travel of the film shown in indicator I.

I prefer to record with as little amplification as possible but in some cases amplification may be needed in the system shown in Fig. 3. Whenever amplification is used the system shown in the above mentioned Hoxie patent may be employed. To secure proper volume of sounds I amplify the currents in testing and re-recording as shown in Fig. 4. The general amplification control may be had in any way but I have shown for illustrative purposes a rheostat 29' in the circuit of filament 24. This rheostat may also be placed in the filament circuit of any of the tubes in the amplifiers A. The volume control will be adjusted at various points and the scale reading of the rheostat control will be noted in conjunction with the film travel given by counter I.

The rheostat 29' controls the general volume and amplifies all frequencies alike while the controls H and H' amplify frequencies differently. The operator may find it necessary during film travel between, say, 50 and 100 feet, to increase the volume of all frequencies ten times. Simultaneously, afterwards or before, the controls H and H' may be operated at film travel 55 to boost the high frequencies five times. At film travel (by way of example), 75, controls H and H' may be operated to double the intensity of the high frequencies in respect to the tones.

As has been stated all these adjustments have been noted in connection with film travel so the settings can be duplicated in re-recording which will now be described. When the sound film has been edited in the way described, which may be after several test runs, the switch S is closed and the film 13 is run for re-recording purposes. The loud speaker switch may be opened at this point and an equivalent impedance Z substituted if desired. The sound currents pass from amplifier A through one or more neon or other lights $L_1$, $L_2$, $L_3$, the number of lights depending upon the number of sub-master records to be simultaneously produced. I have shown only one complete re-recording system as the others will be duplicates. In this system the light from $L_1$ varying in accordance with the sound currents is projected through an appropriate lens system 31 and through a slot 31' to a system of lenses 32, 33, which image the light in the slot on the sensitive film 34, as described in my patent above mentioned. The width of slot 31' is parallel to the plane of the paper.

As the film 13 is run off the reels the operator will manipulate the controls H, H' by setting the dials at the film travel as given in his notes previously made. This will alter the frequency levels in the current in the transformer circuit and the light produced thereby in lamp $L_1$ will faithfuly record the balanced frequencies on the sub-master film 34 which is coated with a fine, substantially non-grain emulsion.

The system shown in the right hand portion of Fig. 4 will illuminate the entire minute section of the sound track functioning at the instant with the slot 31 in accordance with the light then emitted by the lamp $L_1$. As the film 34 is moved to continuously present new section to the light coming through slot 31 transverse sections of varying density (after development) will be formed, as shown in Fig. 2. This produces a variable density record or a plurality of records when the system of Fig. 6 is used. When the system is used for making talking books the entire record may be filled up with a plurality of sound tracks.

In re-recording the master film 13 is moved at any speed desired to obtain a film 34 of proper density. In practice it preferably will be run at speeds slower than those at which film 13 was taken, but commensurate with the speed of emulsion used.

In order to produce a microscopic or greatly reduced record of sound on the commercial records, I move in the system of Fig. 4, the nongrain film 34 at a much slower speed than the prime master film 13. The speed once established, however, is maintained constant throughout the re-recording operation. Various ratios between the speed of film 34 and 13 may be established, depending upon the reduction desired, but a reduction of 10 to 1 is satisfactory. With this reduction, if the complete record on film 13 is 100 feet long a complete record will be made on film 34 within a length of 10 feet. The resolving power of the emulsion used is the limiting factor in the making of satisfactory reduced scale pictures.

Instead of using the counter I and making notes of the scale readings of H and H' in connection therewith, I may use the marker arrangement disclosed in my application above referred to. Either method will enable one to balance the frequencies and increase the general volume for re-recording purposes. Also the controls H and H' may be connected together as shown in such application.

By using a plurality of films such as 34 and their attendant systems, lamp $L_1$, $L_2$ or any desired further number, will simultaneously re-record the sound record of film 13 on additional films. Thus, I may produce any desired number of sub-master records on films corresponding to the record on the prime master film and with proper balance of high and low frequencies and proper general volume.

Films 34 may be reduced in width in comparison to the master record 13, or they may be of the same size. Also a continuation of the same sound rendition, or other renditions, may be recorded on the same film immediately below the first record. When a talking book, as referred to in my above mentioned application is to be recorded on the slow speed film such film may be of endless or belt form and the entire book may be recorded microscopically thereon by spiraling the reduced record around the film until the entire space is filled with the record, or it may be recorded throughout one length of the film such as 13 and then reversed in direction of movement and recorded by moving the film 13 in the opposite direction but after stepping the film sidewise the desired distance between the sound tracks. By alternately moving such film in opposite directions the entire space may be filled with the subject matter of the book, read by a dramatic reader, for instance. Appropriate mechanism would be used to produce these movements of the films.

Instead of using a belt form of film for re-recording as at 34, or instead of alternately reversing the direction of movement of such film, I may use a disc form of film such as shown in Fig. 7 where the microscopic record is recorded spirally thereon by mechanism such as is used in ordinary phonograph recording and reproduction. In this case the circular film would be rotated past the lens 12 instead of moving linearly past the same.

To utilize my improved method in making the microscopic form of talking book, I preferably put a large number of sound tracks, one or more thousandths of an inch wide, on the sub-master film 34. In some cases, as many as 500 minute sound tracks may be made on one sub-master. In making a talking book the voice of the dramatic reader will be recorded on as many master films as are necessary to complete the book. The master film would preferably be made by the variable area record already described.

To save time in re-recording on sub-master films, and to diminish wear and tear on films, I may line up all of the master films on the shaft of suitable re-recording mechanism such as shown in Fig. 6. On this same shaft, or geared thereto, will be a large number of reels carrying sub-master films. In this figure I have shown the book, or a part thereof, as made up of these master films and have shown four sub-master films simultaneously receiving the re-recording. As many master films will be used as are necessary to complete the book or the desired part thereof. There may be hundreds of sub-master films simultaneously receiving the re-recording. Hence, in describing the operation of the system in Fig. 6, I am not limiting the invention to any number either of master or sub-master films. Suppose, for example, the book were a small one and had been recorded on the three master films 41, 42 and 43. These would be assembled on shaft 44 and on this same shaft are assembled the four sub-master films 45, 46, 47 and 48 or any further number of films. The apparatus of Fig. 4 for converting the sound record of each master film into light variations and re-recording is indicated symbolically by 49, 50, 60, 61, 62, and 63.

As reel 41 is run off, the records thereon will be recorded on the first line of the four sub-master films. Simultaneously the next succeeding part of the talking book will be run off of reel 42 and re-recorded on the second line of the sub-masters. At the same time the next succeeding part of the book will be run off reel 43 and will be recorded on the third line of the sub-masters.

In this way the sub-master films need be run only once off their reels to receive the entire record from the master films. This results in a great saving of time in re-recording and eliminates wear.

When the sub-master films have been completed each will have a record of the dramatic reader's rendition of the complete book, or desired part of it. Commercial positives may then be printed from each of these negatives so that large quantities can be produced in minimum time, or the sub-master films may be used as commercial records and contact printing may be avoided altogether.

The commercial positives may be reproduced on appropriate apparatus now used except that the lenses, slots, etc. will be dimensioned to function with the microscopic sound tracks. Ordinary mechanism well known in the art would be used to shift the positives at the end of one line to start in with the next line. That is, the film or the light system would be stepped over one line at the completion of each line of the positives, which could be made in the form of a belt.

I may use ultra violet light from sources such as $L_1$, etc. for re-recording in the system of Figs. 4 and 6. This greatly reduces the time required to make the sub-master records. In such case I would preferably use non-absorbing condensing mirrors to control the ultra violet light but if expenses is not a vital factor quartz lenses may be used.

In Fig. 6 the current from the lamps $L_1$, etc. of Fig. 4 passes in series through devices 61, etc. These devices, also may be arranged in parallel or in other arrangement.

By securing the drums, on which the sub-master films are wound and unwound, on the shaft 44 with which the drums 41, 42 and 43 rotate, the speed of the sub-master films may be made exactly proportional to the speed of the high speed prime master films, and by proportioning the size of the drums containing the sub-master films with respect to the drums of the master films any desired reduction in the size of the sound track may be accommodated. The reduction in speed may also be obtained by reduction gearing or by other means.

The three (or any number) of the master records on drums 41, 42, 43 of Fig. 6 may be combined on one film as shown in Fig. 8. That is, either the records may be reduced so they may be successively taken on different sound tracks side by side on the same film, or the size of the master film may be increased in width to receive the same size sound track. The devices 49, 50 and 60 would be connected to the plurality of devices such as 61, 62 and 63, as shown in Fig. 6, but omitted from Fig. 8 for clearness of illustration.

The master record of Fig. 6 may also be increased in length (or the sound track correspondingly reduced in size) to place the record in series on one film, as shown in Fig. 9. In this case the film may be run from reel 64 around pulley 65 thence around pulley 66 to reel 67. As before the devices 49, 50 and 60 would be connected to recording devices such as 61, 62 and 63 in Fig. 6 for recording on sub-master films omitted from Fig. 9 to simplify the illustration.

In the foregoing description I have disclosed my invention with reference to a transparent film in which the sub-master or commercial sound records are made. Instead of using such transparent records I may use opaque records made of tough paper or other suitable material having a reflecting surface produced by glazing or other process and on this reflecting portion would be placed a light-sensitive emulsion so that one may record the sounds by running the paper film through the recording apparatus previously described. In reproducing sound from these opaque records the light instead of passing through the film would be reflected from its surface in such a way as to utilize the reflected rays for energizing the photoelectric element. This film could be used directly as a commercial record and it would have the advantage of cheapness of construction and in addition it would be substantially non-inflammable, at least as far as setting fire to other objects is concerned.

The master and sub-master film will be developed and fixed in accordance with well known practice and description of the process is unnecessary.

My invention is not limited to making the master record by the photoelectric process. I may make the master record on discs, cylinders, or tapes of wax, metal or other material by cutting grooves therein in well known ways. In making sub-master or commercial records therefrom I arrange it so that the reproducing needle controls the movement of a light reflecting mirror either by mechanical or electrical connections. Light from a lamp would then be reflected on to a photoelectric cell to cause variation in current for re-recording such as disclosed in the system already described.

Having described my invention, what I claim is:

1. The method of recording sound which consists in recording into a sound track all the desired frequencies of the sound, re-recording into a second sound track all the frequencies of one portion of the first mentioned sound track and simultaneously re-recording into a third sound track all the frequencies of another portion of the first mentioned sound track whereby the time of re-recording is reduced.

2. The method of recording sound which consists in recording into a sound track all the desired frequencies of the sound, re-recording into a sound track on a record blank all the frequencies of one portion of the first mentioned sound track and simultaneously re-recording into a sound track on another part of said record blank all the frequencies of another portion of the first mentioned sound track whereby the time of re-cording is reduced.

3. The method of recording sound which consists in recording into a sound track all the desired frequencies of the sound, re-recording into a sound track on a record blank all the frequencies of one portion of the first mentioned sound track and simultaneously re-recording into other separate sound tracks on said record blank parallel with the second sound track, all the frequencies of other separate portions of the first mentioned sound track whereby the time of re-recording is reduced.

4. In phonograph apparatus, means to move a record containing a sound track embodying all the desired sound frequencies, means to move a sensitive film, means to pass light beams on to a plurality of spaced points of said sound track, means to receive said light beams and to produce a plurality of light effects on said sensitive film proportional to the light thus received whereby a plurality of parallel sound tracks is formed on the sensitive film and the time of re-recording is reduced.

5. In phonograph apparatus, means to move a record containing a sound track embodying all the desired frequencies of the sound, means to move a sensitive film, means to pass light beams through a plurality of spaced points of said sound track, means to receive said light beams passing through said points and to produce on said sensitive film at points closely spaced transversely thereof, light effects proportional to the light respectively passing through said plurality of points whereby the time of re-recording is reduced.

BYRON E. ELDRED.